United States Patent [19]

Becker et al.

[11] Patent Number: 4,865,467
[45] Date of Patent: Sep. 12, 1989

[54] ROLL-FORMED BUSHING FOR SLIDING SURFACE BEARINGS

[75] Inventors: Karl Becker, Leon-Rot; Alfred Berger, Wiesloch; Joachim Iwansky, Philippsburg; Roland Köble, Ittlingen; Karl Back, Leon-Rot, all of Fed. Rep. of Germany

[73] Assignee: Kolbenschmidt Aktiengesellschaft, Neckarsulm, Fed. Rep. of Germany

[21] Appl. No.: 234,980

[22] Filed: Aug. 22, 1988

[30] Foreign Application Priority Data

Aug. 29, 1987 [DE] Fed. Rep. of Germany ....... 3728951

[51] Int. Cl.$^4$ ............................................. F16C 33/04
[52] U.S. Cl. .................................. 384/273; 384/279; 384/300
[58] Field of Search ...................... 384/273, 279, 300; 29/DIG. 38, 149.5 R, 149.5 C, 463

[56] References Cited

U.S. PATENT DOCUMENTS

| 547,654 | 10/1895 | Armstrong | 384/273 |
| 4,582,368 | 4/1986 | Fujita et al. | 384/279 |
| 4,598,449 | 7/1986 | Monhardt et al. | 29/DIG. 38 |
| 4,644,624 | 2/1987 | Fontana | 29/149.5 R |
| 4,663,930 | 5/1987 | Landwehrkamp | 29/463 |

Primary Examiner—Lenard A. Footland
Attorney, Agent, or Firm—Sprung Horn Kramer & Woods

[57] ABSTRACT

A roll-formed bushing for sliding surface bearings has no machining allowance in the bearing bore and is made of a strip section and has a butt joint that extends throughout the width of the bearing. In order to reduce the allowances of the bore diameter and the outside diameter of the bearing bushing, the butt joint has been closed by charge carrier beam welding.

4 Claims, 2 Drawing Sheets

ROLL-FORMED BUSHING FOR SLIDING SURFACE BEARINGS

BACKGROUND OF THE INVENTION

This invention relates to a roll-formed bushing for sliding surface bearings, which bushing has been made from a section of strip, preferably of a laminate, specifically of a steel-plastic composite, comprising a butt joint that extends throughout the width of the bearing and has no machining allowance in the bearing bore.

Roll-formed bushings for sliding surface bearings are often used in motor vehicles. In a relaxed state of roll-formed bushing is no-circular and its butt joint is open. When the roll-formed bushing has been forcibly inserted, it is usually circular and its butt joint is closed. The butt joint is preferably parallel to the axis of the bushing. In order to prevent a hooking of the bushing into each other at the open butt joints as the roll-formed bushings are manufactured and transported and in order to simplify simply their forcible insertion, roll-formed bushings can be closed in that the butt joint is latched.

In order to make roll-formed bushings having a latched butt joint, one of the end faces of the strip section is formed with at least one U-shaped indentation and with respective horns formed on both sides of said indentation, which horns extend at right angles to the axis of the bushing. The opposite end face of the strip section is provided with a lug, which consists of a neck and a circular head. The neck is formed at its root with undercuts, which are substantially at right angles to the axis of the bushing and extend behind that end face. As the bushing for the sliding surface bearing is rolled-formed, the lug enters the U-shaped recess and a positive joint is obtained in that each of the two horns is deformed to extend into the adjacent undercut.

But roll-formed bushings having a latched butt joint and intended for sliding surface bearings have the important disadvantage that owing to the above-described design of the end faces of the strip section, the strip must be cut along such lines so that up to 20% of the material will be wasted, in dependence on the diameter and/or the width of the bearing. That disadvantage can be avoided in that the lug is given a contour which corresponds to the contour of the indentation, the head of the lug has substantially the configuration of a rectangle having rounded corners, the length B of the neck of the lug is 0.8 to 1.4 times the wall thickness of the bushing for the sliding surface bearing, and the length of those sides of the head of the lug which are parallel to the end faces of the strip section is 0.6 to 1.2 times said thickness (Published German Application 33 16 767).

In accordance with DIN 1494, in roll-formed bushings for sliding surface bearings having an open or latched joint and having a total wall thickness having a nominal value between 0.75 and 2.5 mm and having no machining allowance in the bearing bore, the allowances of the bearing bushing are between −0.005 to −0.040 mm, in dependence on the nominal dimension.

Because the roll-formed bushings cannot be machined in their bearing bore and the bearing material will be upset adjacent to the butt joint as the roll-formed bushings are manufactured or installed, a relatively high machining expenditure will be required to ensure that the deviations will not exceed the allowances.

SUMMARY OF THE INVENTION

It is an object of the present invention to decrease the allowances of the bore diameter and the outside diameter of the bearing bushing and to achieve this at distinctly lower manufacturing costs.

That object is accomplished in that the butt joint has been closed entirely or in part by charge carrier beam welding.

As a result, the allowances of the bore diameter and the outside diameter of the bearing bushing may be lower by up to one half than those stated in DIN 1494, Table 2, Series B and in any case may be less than 0.010 mm.

Because the allowances are decreased, the bearing clearance in operation will be relatively small so that the bearing will be relatively quiet in operation. As a result, the roll-formed bushings for sliding surface bearings can particularly be used in shock absorber elements which are used for an electronic scanning of the roadways.

The roll-formed bearing bushing designed in accordance with the invention is shown by way of example on the drawings, which will now be explained.

DETAILED DESCRIPTION OF THE INVENTION

Figure 1:
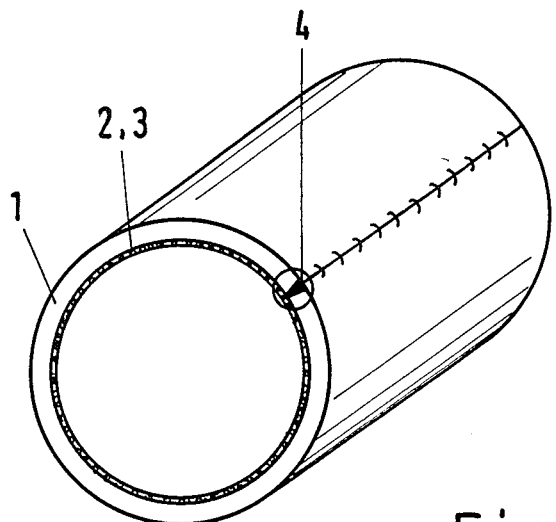
FIG. 1 is an isometric representation showing a roll-formed bushing for sliding surface bearings.

In FIG. 1, the bushing consists of a steel layer 1 and a porous tin bronze layer 2, which has been sinter-bonded to the steel layer and contains a filling and is provided with a cover layer 3. The filling and the cover layer 3 consists of polytetrafluoroethylene with additives, such as 20% lead powder. The butt joint 4 of that bushing has been closed throughout the width of the bushing by laser beam welding.

Figure 2:
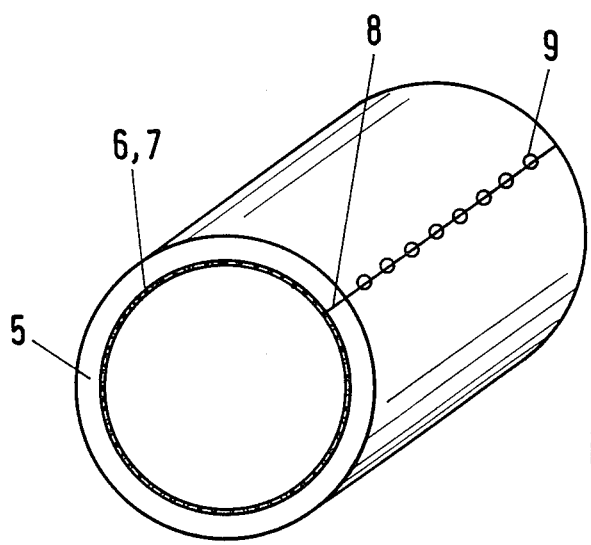
FIG. 2 is an isometric representation showing a roll-formed bushing for sliding surface bearings.

In FIG. 2, the bushing consists of a steel layer 5 and of a porous tin bronze layer 6, which has been sinter-bonded to the steel layer. A thermoplastic layer 7 has been applied to the tin bronze layer. The butt joint 8 has been closed by a plurality of spot welds 9 formed by laser beam welding.

Figure 3:
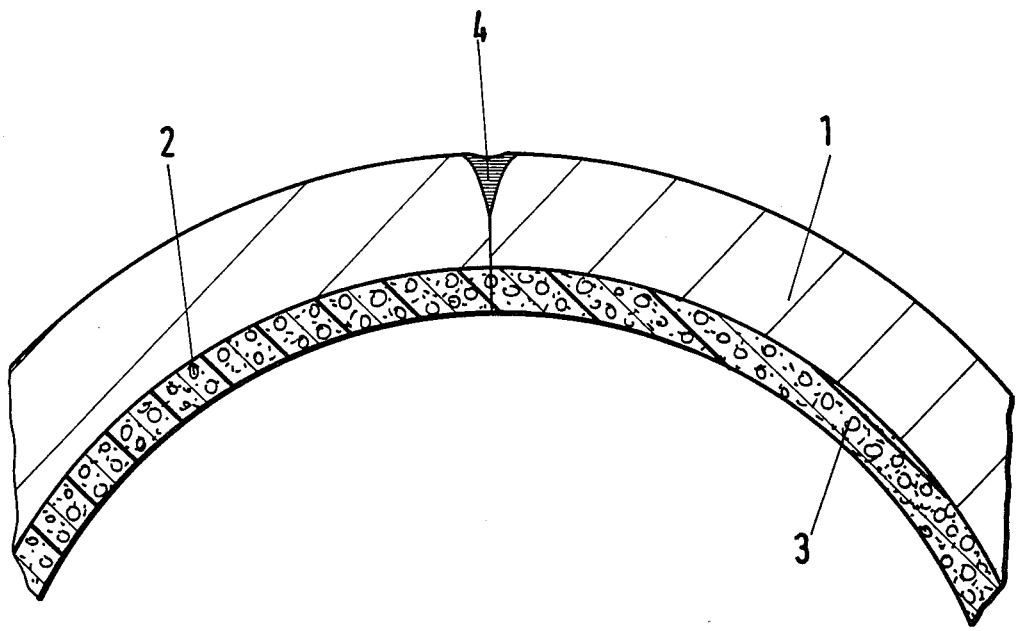
FIG. 3 is an enlarged fragmentary view showing a portion of the roll-formed bushing of FIG. 1 adjacent to the butt joint.

FIG. 3 is an enlarged fragmentary view showing a portion of the roll-formed bushing of FIG. 1 adjacent to the butt joint 4.

What is claim:

1. A roll-formed bushing for sliding surface bearings, the bushing comprising a section of a roll-formed strip composed of a steel-plastic laminate with a steel portion forming an outer surface of the bushing, and a butt joint that extends throughout the width of the bearing and has no machining allowance in the bearing bore, wherein the butt joint is closed at least in part by change carrier beam welding of the steel portion of the laminate.

2. The bushing according to claim 1, wherein the butt joint is closed entirely by charge carrier beam welding.

3. The bushing according to claim 1, wherein the strip comprises a steel layer, a porous tin bronze layer and a cover layer of polytetraflouroethyline.

4. The bushing according to claim 1, wherein the strip comprises a steel layer, a porous tin bronze layer and a thermoplastic layer.